Aug. 19, 1924.

O. W. JOHNSON

TRACTOR HITCH

Filed June 9, 1923

Oliver W. Johnson
INVENTOR

BY Smith & Freeman
ATTORNEYS

Aug. 19, 1924.
O. W. JOHNSON
TRACTOR HITCH
Filed June 9, 1923
1,505,201
3 Sheets-Sheet 2
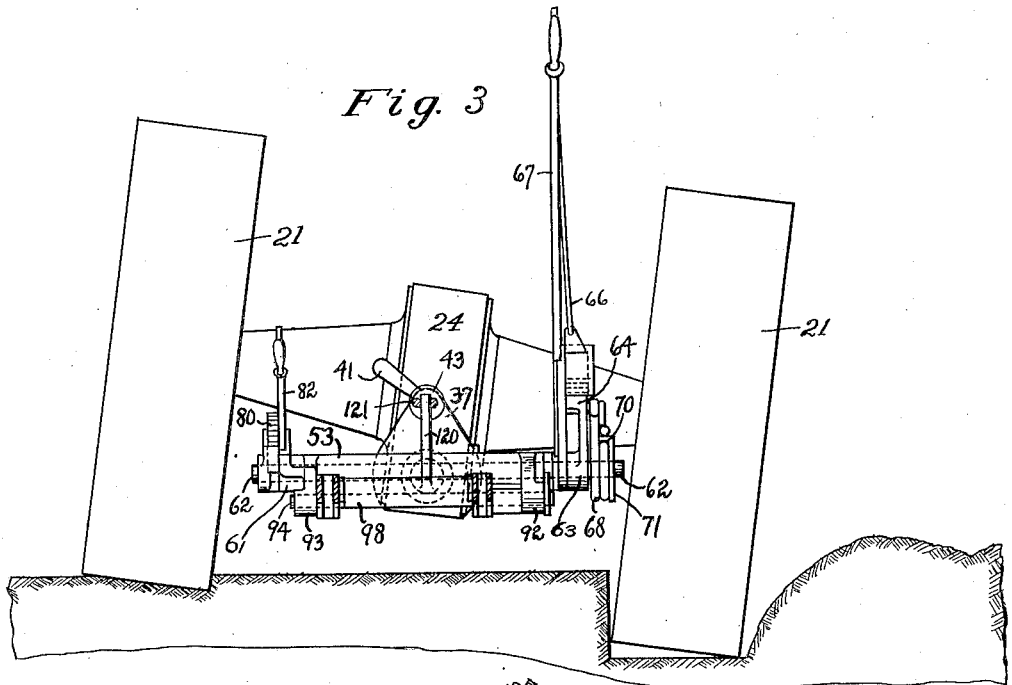
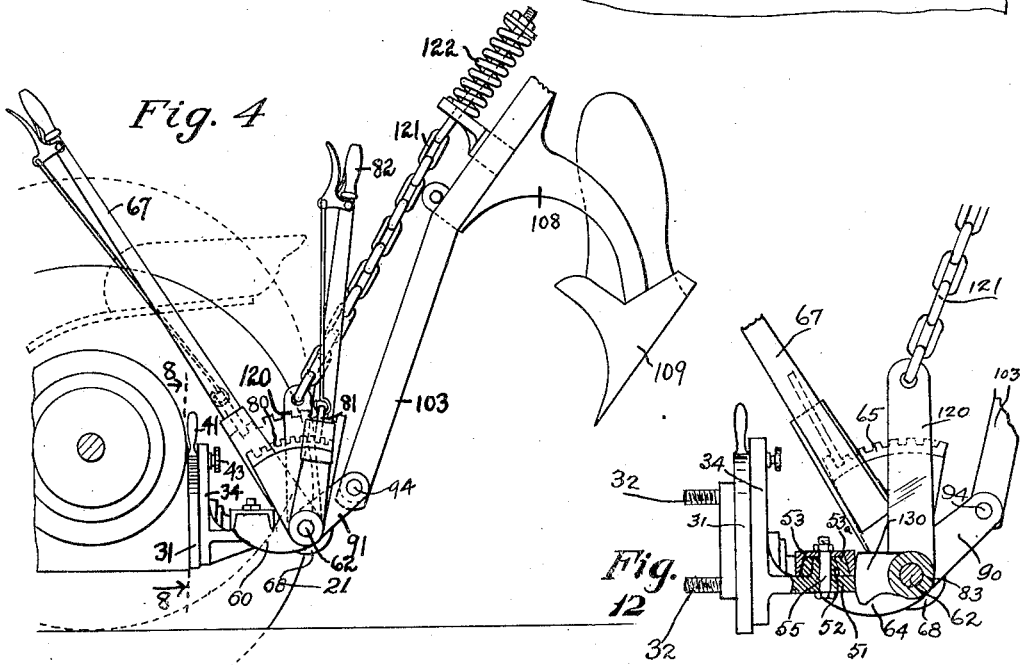
Oliver W. Johnson
INVENTOR
BY Smith & Freeman
ATTORNEYS

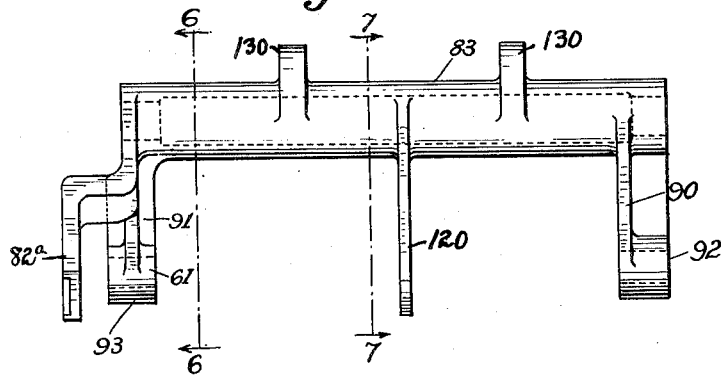
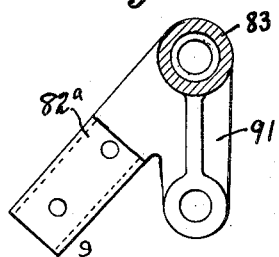
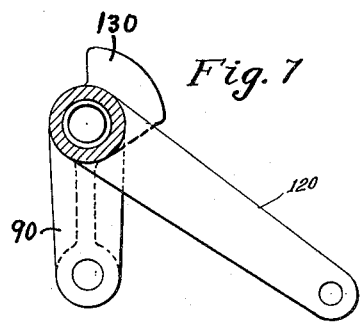
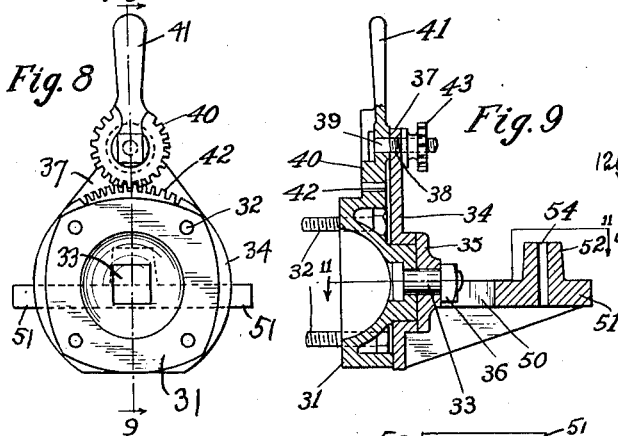
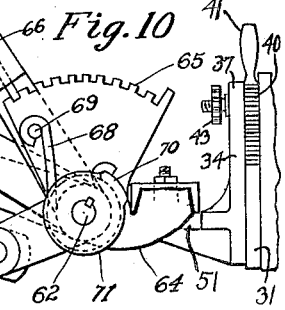
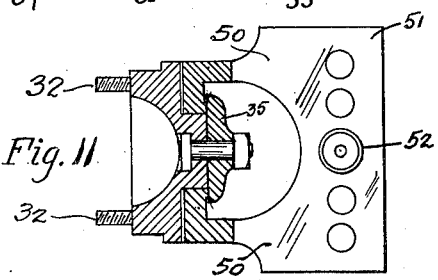

Patented Aug. 19, 1924.

1,505,201

UNITED STATES PATENT OFFICE.

OLIVER W. JOHNSON, OF GENEVA, OHIO.

TRACTOR HITCH.

Application filed June 9, 1923. Serial No. 644,301.

*To all whom it may concern:*

Be it known that I, OLIVER W. JOHNSON, a citizen of the United States, residing at Geneva, in the county of Ashtabula and State of Ohio, have invented a certain new and useful Improvement in Tractor Hitches, of which the following is a full, clear, and exact description, reference being had to the accompanying drawings.

This invention relates to tractor hitches and has for its objects the provision of a new and simplified mechanism adapted for hauling, adjusting and carrying various land cultivating and work-performing implements upon a tractor; the provision of simple and easily actuated devices for adjusting the depth of such implements and their angle relatively to the tractor; the provision of a tractor hitch which shall permit the implements operated thereby to be elevated, depressed, adjusted and manipulated from the seat of the tractor and with a minimum of physical exertion or muscular strength; the provision of a tractor hitch which shall permit a maximum freedom of movement of the parts while the same are in operating position and shall automatically hold them fixed while in carrying position; while further objects and advantages will become apparent as the description proceeds.

In the drawings accompanying this specification and forming a part thereof I have shown, for purposes of illustration, one form which my invention may assume. In these drawings:

Fig. 1 is a side elevation of this illustrative embodiment showing the mechanism attached to a tractor of conventional type, Fig. 2 is a plan view of the mechanism shown in Fig. 1, Fig. 3 is a section on the line 3—3 of Fig. 1, Fig. 4 is a view similar to Fig. 1 but with certain parts broken away and the plows in elevated position, Fig. 5 is a detail of the sleeve, Fig. 6 is a section on the line 6—6 of Fig. 5, Fig. 7 is a section on the line 7—7 of Fig. 5, Fig. 8 is a detail elevation of the mechanism for attaching the plow to the tractor, corresponding to the line 8—8 of Fig. 4, Fig. 9 is a section on the line 9—9 of Fig. 8, Fig. 10 is a fragmentary side elevation illustrating the counterbalancing spring.

Fig. 11 is a top plan view of the draw bar; and

Fig. 12 is a sectional view corresponding to the line 12—12 of Fig. 2 showing the relation of the parts when the implement frame is elevated.

Figure 1:
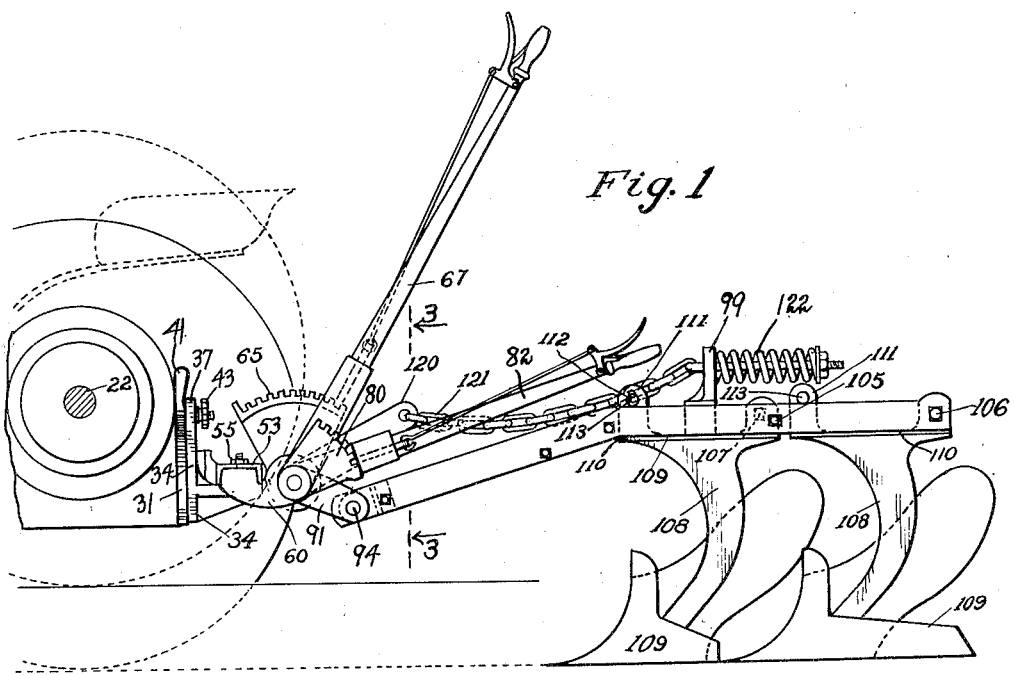

The embodiment of my invention herein illustrated is designed for use with a tractor 20 of the type having rear driving wheels 21 operated by a rear axle 22 contained within a rear axle housing 23 and driven through suitable gearing operated by a transmission shaft (not shown) and housed in a differential housing 24.

The mechanism herein illustrated comprises a plate 31 adapted to be secured to the differential housing 24 by means of a plurality of bolts 32 and to receive a horizontal bolt 33 adapted to hold a plate 34 journaled on the plate 31 against displacement therefrom by means of a washer 35 held in position by a nut 36. This plate 34 is provided with a projection 37 apertured at 38 to receive the shaft 39 of a segmental planet gear 40 which is provided with an operating handle 41, positioned to engage a segmental sun gear 42 carried by the plate 31, and clamped in position by a thumb-nut 43 screw-threaded to the shaft 39.

Integral with the plate 34 are a pair of horizontal arms 50 carrying at their outer ends a horizontal square shouldered plate 51 constituting a draw bar which is provided centrally with a boss 52 adapted to act as a pivot for a horizontal cross bar 53 and apertured at 54 to receive a bolt 55 passing through a cooperating aperture in the cross bar 53 and pivotally securing the same upon the boss 52. The cross bar here shown comprises a channel member having at its middle a cast reinforcing pad 53ª riveted in place and receiving the boss 52.

Secured to one end of the cross bar 53 is a bracket 60 arranged to form one bearing 61 for a shaft 62 the other bearing 63 for which is provided by a bracket 64 carried by the other end of the cross bar 53 and comprising in addition to the bearing 63 a sector 65 adapted to be engaged by the dog 66 of a lever 67 which is rigid with the shaft 62 and therefore operable to angularly position the shaft 62 with respect to its bearings 61 and 63, and restraining the shaft 62 from angular movement in response to the action of a spring 68 coiled about the shaft 62 and having one end secured to a pin 69 carried by the sector 65 and the other end secured to a lug 70 carried by a collar 71 keyed to the shaft 62 and therefore rigid therewith.

Secured to the opposite end of the shaft 62 is a sector 80 adapted to be engaged by a dog 81 carried by a hand lever 82 which is fixed to a sleeve 83 journaled on the shaft 62 between the bearings 61 and 63 and is therefore operative to angularly position the sleeve 83 upon the shaft 62. The cross bar 53 and its end brackets constitutes a kind of main frame to which the implement frame is attached as will now be described.

Integral with the sleeve 83 are a pair of arms 90 and 91 carrying at their free ends enlargements 92 and 93 adapted to receive and support a rod 94 on which is hung a suitable implement frame which in turn carries the plow shares, harrowing devices, seeders, or other implements or devices. In the present embodiment I have shown a pair of side members 96 and 97 braced by means of cross members 98 and 99 and each comprising a pair of plates 100 and 101, and 102 and 103, respectively, each pair of which are separated by means of suitable spacers 104 and at the same time secured together by means of suitable fasteners 105 extending through the plates and through the spacers 104. Pivotally secured to the side members 96 and 97, at 106 and 107 respectively, are a pair of shanks 108 each carrying at its lower end a plow share 109 and provided at its forward upper part with a shoulder 110 underlying the plates of the side member 96 or 97 to limit the movement of the shank 108 in one direction about its pivot 106 or 107 and with a projection 111 extending between the two plates of the side member 96 or 97 and apertured at 112 to receive a plug 113 adapted to overlie the plates of the side member 96 or 97 and normally prevent rotation of the shank 108 in the reverse direction about the pivot 106 or 107 but formed of frangible material such as wood and adapted to yield under abnormal strain to permit the shank 108 to swing about its pivot 106 or 107 to thus prevent fracture of the plow share 109. While I have described this frame in some detail it will be understood that any kind of frame can be used and that its construction will vary with the kind or number of plow shares, or harrow teeth, or cultivating tools, or seeding and fertilizing devices which may be used thereon, and that I do not limit myself to any particular kind of frame or device.

Integral with the sleeve 83 at the center thereof is an arm 120 angularly related to the arms 90, 91, and apertured at its free end to receive one end of a suitable connecting member such as a chain 121, the other end of which is yieldingly connected to a distant part of the implement frame such as the cross member 99, a shock-absorbing member being interposed such as the spring 122.

Figure 2:
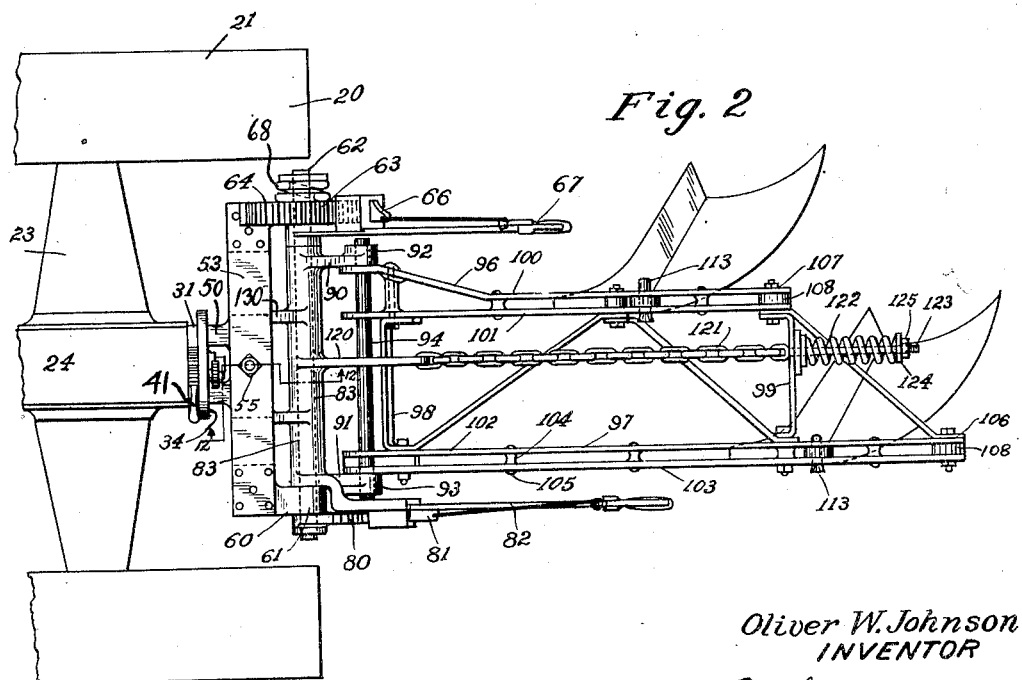

In Figs. 1, 2, and 3 I have shown the device in position for operation and adjusted for use under the usual ploughing conditions wherein one driving wheel 21 of the tractor is traveling on unploughed ground while the other driving wheel 21 is traveling in the furrow. Under these conditions the traction from the tractor 20 is carried from the differential case 24 through the plate 31 and bolt 33 to the plate 34 from the lug 52 of which it is further transmitted by way of the channel 53 and its brackets 60 and 64 through the shaft 62, arms 90 and 91, and rod 94 to the frame and whatever implements are carried thereby.

In case the operator shall desire to change the depth of the furrow he can accomplish this from his seat by withdrawing the dog 81 from the sector 80 and operating the lever 82 to rotate the sleeve 83 about the shaft 62 to cause the arms 90 and 91 to elevate or depress the front end of the implement frame. It is ordinarily not a matter of much importance whether the angular adjustment of the draw bar be used or not. Theoretically the angular relation between the frame and axle should be changed with every change in depth of plowing or lateral inclination of the ground but practically it makes little difference, although the operator can readily effect it by releasing the lock-nut 43 and moving the handle 41 in the appropriate direction.

When the device is to be removed from one point to another without ploughing (or other operation) the lever 82 is first raised while the tractor is moved forward, thus bringing the plough-shares or other implements to the top of the ground and simultaneously taking up the slack in the chain 121. The dog 66 is now retracted from its engagement with the sector 65 and the lever 67 operated to rotate the shaft 62, sector 80, dog 81, lever 82, sleeve 83, and arm 120, to cause the chain 121 to elevate the entire frame about the shaft 62 into raised position as shown in Fig. 4, the movement being assisted by the action of the spring 68. The force of this spring is so adjusted as largely or wholly to counterbalance the weight of the frame and implements carried thereby. The sleeve is preferably provided with a pair of cam projections 130 adapted when the frame is raised to swing past the edge of the cross bar 53 and engage the edge of the draw-bar 51 to hold the frame against side sway. During the normal use of the hitch these cams are located wholly above and out of engagement with the draw-bar so as to enable the necessary pivotal movement required for turning corners. The spring 122 absorbs the shocks encountered in passing over uneven ground while the frame is elevated. To restore the implements to working position the lever 67 is first lowered till the implements rest on the ground after which the depth is adjusted by the lever 82, although it will be apparent that a certain amount of adjustment is also obtainable by moving the lever 67 as the plows enter into the ground. This, however, requires a forcible downward push on the lever 67 since the spring 68 is now under full tension. The reason for providing a sleeve 83 and lever 82 which may be operated independently thereof is to enable the adjustment of the implements for depth without regard to the spring 68, the purpose of the latter being to assist in raising the implement frame bodily so as to enable the use of the device by any woman or child who is able to operate the tractor. It will be understood, however, that this one method of operating the rocker is illustrative only and that my invention is not limited thereto.

While I have illustrated my improvements as applied to a plowing device, it will be understood that the frame may take many other forms and that numerous implements other than plows can be employed, such as harrowing mechanism, either fixed or movable, cultivating mechanism, seeding mechanism, rolling mechanism, fertilizing mechanism, root-digging mechanism, harvesting mechanism, and numerous other devices which require to be hauled, dragged or supported about a field or road. It will be further noted that when the entire machine herein illustrated is employed a mechanism is provided wherein the weights are so balanced that the device can be manipulated by any woman or child capable of operating a tractor, although it will be understood that my improvements are not negatived merely by the omission, change, substitution, or rearrangement of parts so long as the same conform to the spirit of my several claims.

Having thus described my invention, what I claim is:

1. In a tractor hitch, a member adapted for rigid attachment to the differential gear casing of a tractor, said member having a vertical face and a central horizontal pivot member, a second member pivoted to said first member about such pivot in engagement with said vertical face and carrying a draw bar, and an implement frame pivoted to said draw bar for vertical adjustment relative to said draw bar.

2. In a tractor hitch, a member adapted for rigid attachment to the differential gear casing of a tractor, said member having a central horizontal pivot member, a second member pivoted to said first member about such pivot, a draw bar carried by said second member, and means independent of said pivot member for securing said members together to resist pivoting movement.

3. In a tractor hitch, a member adapted for rigid attachment to the differential gear casing of a tractor, said member having a central horizontal pivot member, a second member pivoted to said first member about such pivot, a plate projecting from said second member substantially parallel to such pivot axis, a cross bar pivoted to said plate transversely of such pivot axis, and an implement frame pivoted to said cross bar for vertical adjustment relative to said cross bar.

4. In a tractor hitch, a member adapted for rigid attachment to the differential gear casing of a tractor, said member having a horizontal pivot member, a second member pivoted to said first member about such pivot, a cross bar pivoted to said second member about an axis which is perpendicular to the first named pivot, and an implement frame pivoted to said cross bar about an axis which is perpendicular to both first named pivots.

5. In a tractor hitch, a member adapted for rigid attachment to the differential gear casing of a tractor, a second member pivoted to said first member upon a horizontal axis and having a draw bar projecting therefrom, a cross bar pivoted to said draw bar upon a vertical axis, a frame pivoted to said cross bar upon an axis which is perpendicular to both the first mentioned axes, manually operable means for moving said frame about said last mentioned axis, and means whereby the elevation of said frame will automatically lock said cross bar against movement about such second pivot.

6. In a tractor hitch, a member adapted for rigid attachment to the differential gear casing of a tractor, a second member pivoted thereto about a horizontal axis, a sun gear carried by one of said members, and a planet gear carried by the other of said members and adapted to be rotated about said sun gear to adjust the relative position of said members.

7. In a tractor hitch, a member adapted for rigid attachment to the differential gear casing of a tractor, a second member pivoted to said first member about a horizontal axis and carrying a draw bar, a sun gear carried by one of said members, a planet gear carried by the other of said members and adapted to be rotated about said sun gear to adjust the relative position of said members, and means for clamping said planet gear against rotation.

8. In a tractor hitch, in combination, a draw bar adapted to be rigidly secured to a tractor, a cross bar pivoted to said draw bar on a substantially vertical axis, an implement frame pivoted to said cross bar perpendicularly of said first axis, and manually operable means for raising and lowering said implement frame about said second axis.

9. In a tractor hitch, in combination, a draw bar adapted to be rigidly secured to a tractor, a cross bar pivoted to said draw bar on a substantially vertical axis, an implement frame pivoted to said cross bar perpendicularly of said first axis, and manually operable means for raising and lowering said implement frame about said second axis, and means operative upon elevation of said implement frame to a position clear of the ground for automatically locking said cross bar relative to said first axis.

10. In a tractor plow, an implement frame, a second rotatable member, means supporting said implement frame from said second rotatable member and arranged to cause rotation of said second rotatable member to raise or lower said implement frame, a first rotatable member rotatably supporting said second rotatable member, and a main frame rotatably supporting said first rotatable member.

11. In a tractor hitch, in combination, a cross bar, means for supporting said cross bar at the rear of a tractor, an implement frame pivoted to said cross bar upon a substantially horizontal axis, a hand lever for raising and lowering said frame relatively to said axis, and a counterpoise spring operatively connecting said frame and cross bar and assisting in supporting the weight of said frame and implements.

12. In a tractor hitch, in combination, a draw bar, means for supporting said draw bar at the rear of a tractor, a cross bar pivoted to said draw bar on a substantially vertical axis, an armed member pivoted to said cross bar upon a substantially horizontal axis, an implement frame having its forward end pivoted to such arms upon a horizontal axis, and a hand lever for rocking said member about its axis.

13. In a tractor hitch, in combination, a draw bar, means for supporting said draw bar at the rear of a tractor, a cross bar pivoted to said draw bar on a substantially vertical axis, an armed member pivoted to said cross bar upon a substantially horizontal axis, an implement frame having its forward end pivoted to such arms upon a horizontal axis, means for rocking said member about its axis so as either to raise or lower the front end of said frame, and a tension member having a lost motion connection with one of the arms of said member and attached to the rear end of said frame whereby the latter is lifted bodily when its forward end has been raised a predetermined amount.

14. In a tractor hitch, in combination, a draw bar adapted for rigid attachment to a tractor, an implement frame, manually operable means carried by said draw bar for raising and lowering said frame bodily, said means including a counterpoise spring, and manually operable means independent of said first means for raising and lowering the forward end of said frame.

15. In a tractor hitch, in combination, a cross bar, a rock shaft journaled thereto upon a substantially horizontal axis, a sleeve journaled on said shaft and having arms, operating levers for said sleeve and shaft, means for securing said sleeve and shaft together in a plurality of adjusted positions, an implement frame having its forward end pivoted to said arms, the rearward end of said frame being attached to said sleeve by a lost-motion connection adapted to elevate the same when moved sufficiently far forward, and a counterpoise spring connecting said shaft and cross bar.

16. In a tractor hitch, in combination, a cross bar, a rock shaft journaled thereto upon a substantially horizontal axis, a counterpoise spring operatively connecting said cross bar and rock shaft, a lever for rotating said shaft and locking it to said cross bar, a sleeve journaled on said shaft, a lever for rotating said sleeve, means for locking said sleeve to said rock shaft in a plurality of adjusted positions, a plurality of arms carried by said sleeve, and an implement frame fastened to said arms.

17. In a tractor hitch, in combination, a rotatably adjustable member, an arm carried thereby, an implement frame, and a tension member connecting said arm with the rear end of said frame whereby said frame is lifted bodily when said member is turned forward, said tension member including a shock-absorbing spring.

18. In a tractor hitch, in combination, a cross bar, a rock shaft journaled thereto upon a substantially horizontal axis, a counterpoise spring operatively connecting said cross bar and rock shaft, a lever for rotating said shaft, means for securing said shaft to said cross bar in different angular positions, a sleeve journaled on said shaft, arms projecting from said sleeve at different angles, a lever for rotating said sleeve, means for locking said sleeve to said shaft at different angular positions, an implement frame having its forward end pivoted to certain of said arms, and means for securing the rear end of said frame to other of said arms, said last means including a shock-absorbing spring.

19. In a tractor hitch, a main frame, a pair of rotatable members mounted for concentric and independent rotation relative to said frame and each other, an implement frame supported by one of said members, means for locking that member to the other member, and means for locking the other member to the main frame.

20. In a tractor hitch, a main frame, a pair of rotatable members mounted for concentric and independent rotation relative to said frame and each other, an implement frame supported by one of said members, means for adjustably locking that member to the other member, and means for adjustably locking the other member to the main frame.

21. In a tractor hitch, a main frame, a rotatable member journaled therein, means for locking said member to said main frame, a second rotatable member journaled on said first rotatable member concentric therewith, means for locking said second rotatable member to said first rotatable member, and an implement pivoted to said second rotatable member.

22. In a tractor hitch, a main frame, a rotatable member journaled therein, means for adjustably locking said member to said main frame, a second rotatable member journaled on said first rotatable member concentric therewith, means for adjustably locking said second rotatable member to said first rotatable member, and an implement frame carried by said second rotatable member.

23. In a tractor hitch, a main frame, a pair of members concentrically and independently rotatable with relation to said main frame, an implement frame carried by one of said members, means for rotating said member and locking it to the other member, and means for rotating said other member and locking it to said main frame.

24. In a tractor hitch, a main frame, a pair of members concentrically and independently rotatable with relation to said main frame, an implement frame carried by one of said members, means for rotating said member and locking it to the other member, means for rotating said other member and locking it to said main frame, and means carried by the implement frame carrying member for elevating the implement frame out of contact with the ground.

25. In a tractor hitch, a main frame, a rotatable member journaled therein, means for locking it to said main frame, a second rotatable member journaled on said first rotatable member and rotatable concentrically therewith, means for rotating said second rotatable member and locking it to said first rotatable member, an implement frame supported by said second rotatable member, and means carried by said second rotatable member for elevating the implement frame out of contact with the ground.

26. In a tractor hitch, a main frame, a rotatable member journaled therein, a second rotatable member journaled on said first rotatable member and rotatable concentrically therewith, an implement frame supported from said second rotatable member in such manner as to be raised or lowered by rotation thereof, means for rotating said second rotatable member, and means carried by said second rotatable member adapted when the latter is rotated a small distance to raise or lower the forward end of the implement frame and when rotated a greater distance to raise or lower the entire frame, and means for rotating said first rotatable member.

27. In a tractor plow, an implement frame, a second rotatable member, means supporting said implement frame from said second rotatable member and arranged to cause rotation of said second rotatable member to raise or lower said implement frame, means carried by said second rotatable member adapted to elevate said implement frame into inoperative position, a first rotatable member rotatably supporting said second rotatable member, and a main frame rotatably supporting said first rotatable member.

28. In a tractor hitch, a main frame, means for supporting said main frame from a tractor providing for adjustment of said main frame in regard to said tractor in a plane perpendicular to the longitudinal axis of the tractor, an implement frame, and means for supporting said implement frame from said main frame providing for adjustment of said implement frame to regulate the depth of the furrow and an independent adjustment of said implement frame into and out of operative position.

29. In a tractor hitch, a main frame, means for supporting said main frame from a tractor providing for angular adjustment of said main frame about a horizontal longitudinal axis, a pair of rotatable members mounted for concentric and independent rotation relative to said frame and each other about an axis perpendicular to the first mentioned axis, an implement frame supported by one of said members, means for locking that member to the other member, and means for locking the other member to the main frame.

30. In a tractor hitch, a main frame, means for supporting said main frame from a tractor providing for augular adjustment of said main frame about a horizontal longitudinal axis, a pair of rotatable members mounted for concentric and independent rotation relative to said frame and each other about an axis perpendicular to the first mentioned axis, an implement frame supported by one of said members, means for adjustably locking that member to the other member, and means for adjustably locking the other member to the main frame.

31. In a tractor hitch, a main frame, means for supporting said main frame from a tractor providing for angular adjustment of said main frame about a horizontal longitudinal axis, a rotatable member journaled in said main frame, means for locking said member to said main frame, a second rotatable member journaled on said first rotatable member concentric therewith, means for locking said second rotatable member to said first rotatable member, and an implement frame carried by said second rotatable member.

32. In a tractor hitch, a main frame, means for supporting said main frame from a tractor providing for angular adjustment of said main frame about a horizontal longitudinal axis, a rotatable member journaled in said main frame, means for adjustably locking said member to said main frame, a second rotatable member journaled on said first rotatable member concentric therewith, means for adjustably locking said second rotatable member to said first rotatable member, and an implement frame carried by said second rotatable member.

33. In a tractor hitch, a main frame, means for supporting said main frame from a tractor providing for angular adjustment of said main frame about a horizontal longitudinal axis, a pair of members concentrically and independently rotatable with relation to said main frame, an implement frame carried by one of said members, means for rotating said member and locking it to the other member, and means for rotating said other member and locking it to said main frame.

34. In a tractor hitch, a main frame, means for supporting said main frame from a tractor providing for angular adjustment of said main frame about a horizontal longitudinal axis, a rotatable member journaled in said main frame, means for locking it to said main frame, a second rotatable member journaled on said first rotatable member and rotatable concentrically therewith, means for rotating said second rotatable member and locking it to said first rotatable member, and an implement frame supported by said second rotatable member.

35. In a tractor hitch, a main frame, means for supporting said main frame from a tractor, a pair of members concentrically and independently rotatable with relation to said main frame, an implement frame carried by one of said members, means for rotating said member and locking it to the other member, means for rotating said other member and locking it to said main frame, and means carried by the implement-frame-carrying-member for elevating the implement frame into inoperative position.

36. In a tractor hitch, a main frame, means for supporting said main frame from a tractor, a rotatable member journaled in said main frame, a second rotatable member journaled on said first rotatable member and rotatable concentrically therewith, an implement frame supported from said second rotatable member in such manner as to be raised or lowered bodily by an extreme rotation thereof and to be adjusted angularly by a smaller rotation thereof, means for rotating said second rotatable member and locking it to said first rotatable member, means carried by said second rotatable member adapted to elevate said implement frame into inoperative position, and means for rotating said first rotatable member and locking it to said main frame.

37. In a tractor hitch, the combination with a draw bar and a main frame carried thereby, of an implement frame, and means for raising said last frame into inoperative position comprising a resilient element adapted to be placed under tension during the raising movement to thereafter hold said implement frame yieldingly in raised position.

38. In a tractor hitch, the combination with a draw bar, of a cross bar pivoted to said draw bar upon a substantially vertical axis, a rocking member journaled to said cross bar upon a substantially horizontal axis, an implement frame operatively connected to said rocking member so as to be raised and lowered thereby, means for turning said rocking member, and cam projections carried by said rocking member adapted to engage said draw bar when the implement frame is elevated to lock said cross bar against movement about the vertical axis.

39. In a tractor hitch, the combination with a rigid draw bar of a cross bar carried thereby, a rocking member pivoted thereto upon a horizontal axis transversely of the tractor, means including a lever and sector for turning said rocking member, a plurality of arms projecting from said member at different angles, an implement frame having its forward end pivoted to certain of said arms so as to be raised and lowered thereby, and a lost-motion tension connection between other of said arms and the rear end of said frame adapted to permit free movement of the rocking member through a small angle and to elevate the rear end of the frame when such angle is exceeded.

In testimony whereof, I hereunto affix my signature.

OLIVER W. JOHNSON.